United States Patent
Reinhardt

[15] 3,670,822
[45] June 20, 1972

[54] IMPLEMENT LOAD TRANSFER
[72] Inventor: Robert L. Reinhardt, Lubbock, Tex.
[73] Assignee: Clark Equipment Company
[22] Filed: July 2, 1970
[21] Appl. No.: 52,036

[52] U.S. Cl. .............................. 172/7, 172/781, 280/405, 280/446
[51] Int. Cl. ........................................ B62d 53/00
[58] Field of Search ............ 280/405, 446, 406; 172/781, 172/7

[56] References Cited

UNITED STATES PATENTS 3,063,740 11/1962 Hancock ........................ 280/405 R
3,073,622 1/1963 Merritt ............................ 280/405 B

FOREIGN PATENTS OR APPLICATIONS 487,895 6/1938 Great Britain ................ 280/405 R Primary Examiner—Leo Friaglia
Attorney—Kenneth C. Witt, John C. Wiessler, Robert H. Johnson and Reginald J. Falkowski

[57] ABSTRACT

An apparatus is disclosed having hydraulic means for exerting a variable downward force on the tongue of a tractor drawn implement to optimize the tractive pull of the tractor. The apparatus is carried by the implement and includes a linear device connected to sense the drawing force exerted upon the implement and a second linear device connected between the implement and its tongue to exert a downward force upon the tongue that is a function of the drawing force sensed by the first device.

4 Claims, 4 Drawing Figures

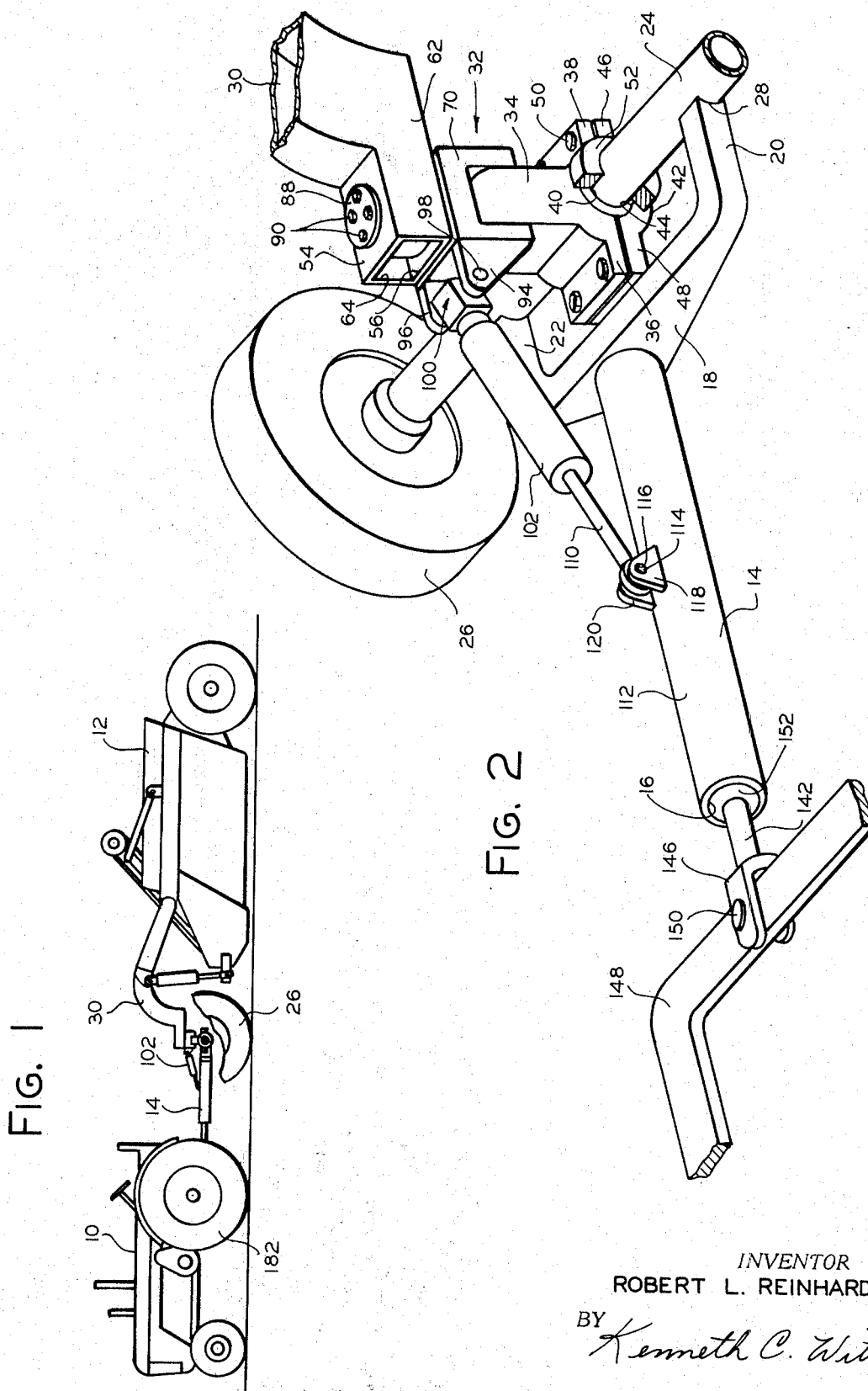

INVENTOR
ROBERT L. REINHARDT
BY Kenneth C. Witt
ATTORNEY

IMPLEMENT LOAD TRANSFER

BACKGROUND OF THE INVENTION

When a four wheeled tractor is used to pull an implement by means of a tongue or drawbar, the drawing force that may be exerted is dependent upon both the capability of the tractor power plant and upon the traction or effectiveness with which the tractor driving wheels engage the ground. The tractive effort of the driving wheels may be substantially increased by increasing the downward force exerted upon them and, because the mere addition of weight to the tractor often entails added expense in both cost and performance, it is known for either the tractor or the implement to comprise an apparatus that transfers a portion of the implement's weight to the driving wheels to augment their tractive effort. Weight transfer apparatuses carried by the implement and forming a part of the implement's tongue or drawbar are usually preferable over those carried by the tractor because they do not require the mating of a particular implement with a specially equipped tractor, and also because they may be designed to fulfill any unique requirements of the implement. Some such weight transfer apparatuses are designed to transfer a constant amount of the implement's weight to the tractor driving wheels regardless of the draft load or tractor implement orientation, while other apparatuses are designed to transfer only sufficient weight to maintain the drawing force constant. Advanced weight transfer apparatuses are designed to transfer a variable amount of the implement's weight to the tractor driving wheels depending as a function on the variable drawing force. In this manner the tractor's capabilities are most efficiently utilized throughout its drawing operation because it is not overburdened when its work is light or insufficiently loaded when its work is heavy.

SUMMARY OF THE INVENTION

In carrying out my invention in one preferred form thereof, I provide an apparatus for exerting a downward force on the tongue of a drawn implement that varies as a selected function of the drawing force exerted upon the implement. The apparatus is carried by the implement and comprises a linear fluid device connected to sense the drawing force and another linear fluid device connected between the implement and its tongue to exert the downward force in response to the drawing force sensed.

BRIEF DESCRIPTION OF THE DRAWING

FIG. 1 is a diagrammatic view of a tractor operatively connected to a draft implement and embodying this invention, FIG. 2 is an enlarged perspective view of a portion of FIG. 1 showing the implement tongue in more detail.

DESCRIPTION OF THE PREFERRED EMBODIMENT gooseneck

Figure 4:
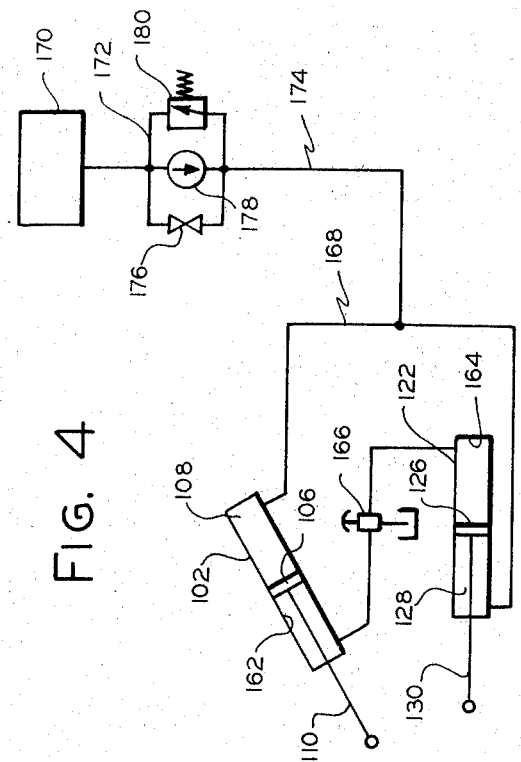
FIG. 4 is a schematic diagram of the hydraulic circuit disclosed in this embodiment.

Referring to FIGS. 1 and 2, the numeral 10 designates a tractor and the numeral 12 designates an implement such as an earth handling device or elevating scraper. Implement 12 has a tongue 14 of hollow construction having an open end 16 and a yoke end 18 comprising spaced arms 20 and 22 secured to an axle 24 which carries a pair of wheels 26. The tongue is rigidly mounted to axle 24 by arms 20 and 22 by suitable means, such as welding indicated at 28. The implement also includes a gooseneck 30 of tubular construction for attachment to a fifth wheel assembly indicated generally at 32.

Mounted for fore and aft rocking on axle 24 at substantially the center thereof is a post or block member 34 having forwardly and rearwardly extending flanges 36 and 38, and a semicircular portion in its lower end as indicated at 40 which bears upon the upper side of the axle. A plate or bearing member 42 having a semicircular portion 44 and flanges 46 and 48 adapted to mate with flanges 36 and 38 is provided for engaging the underside of the axle. Flanges 36 and 38 and 46 and 48 are provided with aligned openings for receiving bolts 50 therethrough to detachable and rotatably mount block 34 on axle 24, so that the two semicircular portions 40 and 44 provide a bearing for the block on the axle. Axle 24 is provided with a collar 52 on one side of block 34 that operates in conjunction with a similar second collar (not shown) on the other side of block 34 to prevent lateral movement of the block on the axle.

Figure 3:
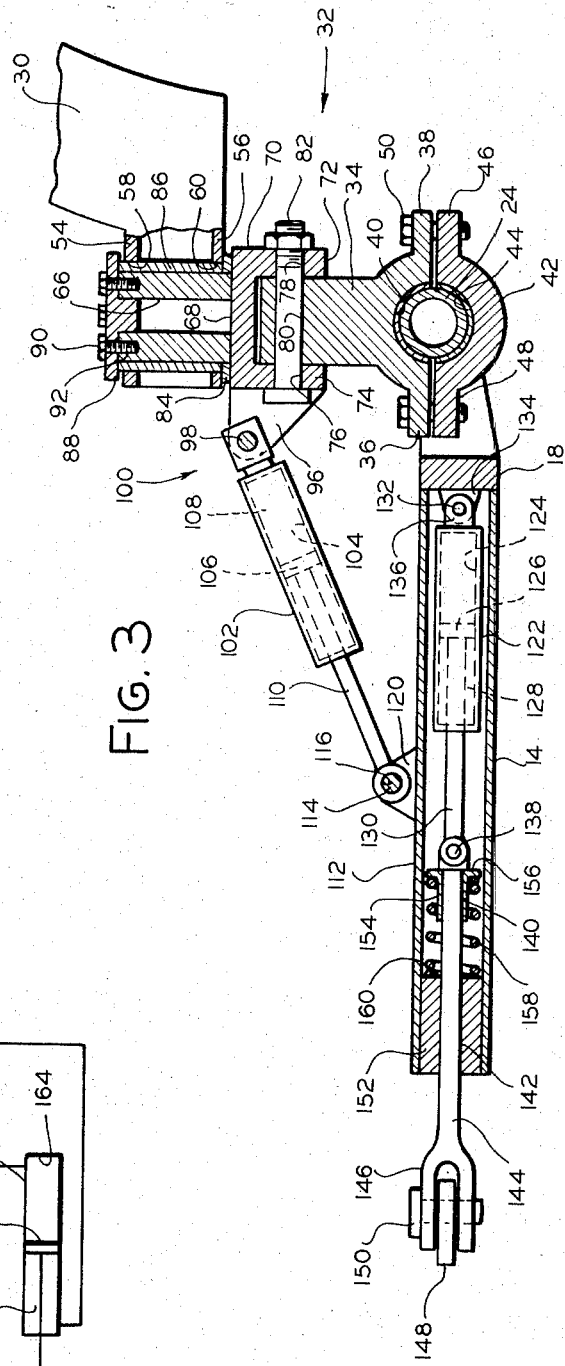
FIG. 3 is a sectional view taken along the axis of the tongue of FIG. 2 to illustrate certain components contained within the tongue.

Referring to FIGS. 2 and 3, gooseneck 30 includes forwardly extending spaced horizontal plates 54 and 56 having aligned openings 58 and 60 therethrough for receiving fifth wheel assembly 32 and also having vertical sides 62 and 64. Fifth wheel assembly 32 includes a tubular member 66 that extends vertically through openings 58 and 60 and has its lower end welded or otherwise suitably secured to the top plate 68 of a yoke member 70 which has depending spaced arms 72 and 74 provided with aligned openings 76 and 78. Block 34 has an opening 80 longitudinally of the implement and a bolt 82 engages in said opening and the openings 76 and 78 to pivotally mount gooseneck 30 of the implement to axle 24 for transverse or lateral pivotable movement of the axle relative to the implement when wheels 26 are on uneven ground.

A wear washer 84 is provided for surrounding the lower end of the tubular member 66 and engages the lower surface of plate 56. A sleeve 86 surrounds tubular member 66 having its lower end engaging wear washer 84 and extending loosely through opening 60 and its upper end connected to plate 54 of the gooseneck 30. The cap 88 is secured to tubular member 66 by stud bolts 90 that engage in the threaded sockets 92 disposed in member 66 to retain gooseneck 30 on fifth wheel assembly 32.

Rigidly secured to member 70 by welding or other suitable means is a pair of spaced brackets 94 and 96 having aligned openings for receiving a pin 98 therethrough. Connected to pin 98 is a universal type joint indicated at 100 having a single acting piston and cylinder type linear fluid device 102 connected thereto to permit device 102 to swivel or turn at any angle within defined limits while transferring forces with member 70. Device 102 is of the type commonly used in the hydraulic art and comprises a cylinder 104, a piston 106 slidably disposed in the cylinder that defines with cylinder 104 a head end fluid chamber 108, and a piston rod 110 connected to the piston and extending outwardly through one end of the cylinder. Piston rod 110 is pivotally connected to the upper surface 112 of tongue 14 by means of a pin 114 extending through rod 110 and also through aligned openings 116 in a pair of spaced triangular shaped brackets 118 and 120 welded to tongue 14. Referring specifically to FIG. 3, a linear fluid device 122 that is adapted to sense the drawing force of tractor 10 and is similar to device 102 is disposed within tongue 14 and comprises a cylinder 124, a piston 126 slidably disposed in the cylinder that defines with cylinder 124 a rod end fluid chamber 128, and a piston rod 130 connected to the piston and extending outwardly through one end of cylinder 124. Cylinder 124 is pivotally connected to yoke 18 by means of a pin 132 through a bracket 134 connected to yoke 18 and a bracket 136 connected to cylinder 124. Piston rod 130 is adapted to receive a portion of of the drawing force and is pivotally connected by a pin 138 to the end 140 of a connecting bar or rod 142. Connecting bar 142 has its other end 144 extending through the opening 16 in the outer end of the tongue and has a bifurcated or clevis end 146 for attachment to a drawbar 148 of the tractor by a pin 150 for a swinging pivotal movement of the tongue with respect to the drawbar when turning the tractor. The opening 16 in the end of tongue 14 is provided with a bushing 152 through which connecting bar 142 is slidably disposed to prevent excessive transverse movement between the bar and the tongue. Connected near the end 140 of bar 142 is a sleeve 154 of a selected length that has a flange 156 thereon for retaining one end of a spring 158. The other end of spring 158 abuts a shoulder 160 of bushing 152 so that, during normal operation, the variable drawing force of tractor 10 is transmitted to tongue 14 partially through spring 158 and partially through device 122. In the event that the tractor drawing force becomes excessive, sleeve 154 is adapted to abut shoulder 160 for the direct transmission of forces from tractor 10 to tongue 14, thereby limiting the operation of spring 158 to its elastic range and the operation of piston 126 within cylinder 124.

Referring now to FIG. 4, the hydraulic circuit comprising fluid devices 102 and 122 is shown schematically. The rod end chamber 162 of device 102 and the head end chamber 164 of device 122 are provided with a breather 166 of a common type that is adapted to maintain the chambers at ambient pressures while protecting the chambers from dirt and other contaminants. The head end fluid chamber 108 of device 102 and the rod end fluid chamber 128 of device 122 are interconnected for fluid communication by a flexible hydraulic hose 168 and it will now be recognized that devices 122 and 102 bear a master-slave relationship to each other. Hose 168 provides a source of makeup fluid from a reservoir 170 that is hydraulically connected to hose 168 through a valve system 172 and a secondary hydraulic hose 174. Valve system 172 comprises three valves in parallel flow relationship; a manual valve 176 permitting the easy raising and lowering of tongue 14 during tractor hookup and the selection of a downward force for normal operation, and a one way check valve 178 and relief valve 180 that in concert permit controlled down pressure and compensate for differential volumes between chamber 108 and chamber 128 during operation. The relative volumes of chambers 108 and 128 and relative areas of pistons 106 and 126 may be selected to provide a desired functional relationship between the travel of rods 110 and 130 and also between the drawing force upon connecting bar 142 and the downward force upon tongue 14.

In operation, the drawing force of tractor 10 urges connecting bar 142 to translate forward slightly within tongue 14. The forward movement of bar 142 is increasingly resisted by spring 158 and device 122 until sufficient force is transmitted to implement 12 that it begins to track. If the progress of implement 12 is impeded as it moves across uneven ground the drawing force exerted upon bar 142 will be increased and the bar will be drawn slightly forward relative to tongue 14 by tractor 10. As bar 142 moves forward, device 122 senses the increased drawing force as reflected in the reduced volume of fluid chamber 128 and increased pressure of the fluid contained therein so that hydraulic fluid is transferred through hose 168 to pressurize fluid chamber 108, thereby extending device 102 and exerting a downward force upon tongue 14 and bar 142. The downward force upon bar 142 is transferred through drawbar 148 to the traction wheels 182 of tractor 10 for a greater tractive effort in overcoming the impedance of implement 12. When the drawing force exerted upon bar 142 returns to its operating level, spring 158 urges bar 142 and piston 126 toward their selected operating position and the downward force upon wheels 182 reduces to a level selected for most efficient operation.

While I have described and illustrated herein a preferred embodiment of my invention, incorporated in one type of implement, it will be apparent to those skilled in the art that my invention may be incorporated in a variety of implements and that other embodiments and modifications of the invention may be made. It should be understood therefore, that I intend to cover by the appended claims all modifications and variations which fall within the true spirit and scope of my invention.

I claim:

1. An apparatus for exerting a downward force on the tongue of a drawn implement comprising a first linear fluid device connected to the implement to sense the drawing force exerted upon the implement and a second linear fluid device connected between the implement and the tongue, said first device comprising relatively reciprocal first piston and cylinder elements, one said first element connected to receive a portion of said drawing force and the other said first element connected to the implement, said first piston defining within said first cylinder first and second fluid chambers, the fluid pressure in said first chamber transferring the portion of said drawing force received by said one first element to said other first element, and wherein said second device comprises relative reciprocal second piston and cylinder elements, one said second element connected to the implement and the other said second element connected to the tongue, said second piston defining within said second cylinder third and fourth fluid chambers, said first chamber connected for fluid communication with said third chamber so that the fluid pressure in said third chamber is maintained substantially equivalent to the pressure in said first chamber, the pressure in said second chamber and said fourth chamber being maintained substantially constant and wherein the apparatus also comprises a valve system connected for fluid communication with said first and third chambers, said valve system comprising means for selecting the volume of said first and third chambers when a selected drawing force is received by said first device and for limiting the fluid pressure in said first and third chambers to a selected maximum, and a spring connected to said one first element and to the implement, said spring transferring a portion of said drawing force to the implement and also urging said one first element toward a selected position and a sleeve having a selected length connected to said one first element, said sleeve providing means for limiting the travel of said one first element relative to said other first element and also for limiting the compression of said spring.

2. An earth moving apparatus having a cutting element engageable with the ground adapted to be drawn by a tractor comprising a tongue pivotally connected thereto in front of said element, a portion of said tongue trailingly engageable with said tractor and being of hollow construction and containing therein a first linear fluid device having a first piston slidably disposed within a first cylinder, one being connected to said tongue and said other connected to receive a portion of the drawing force exerted upon said portion of the tongue, said first piston defining with said first cylinder, a first fluid chamber, a second linear fluid device having a second piston slidably disposed within a second cylinder, one connected to the apparatus above said portion of the tongue and the other connected to said tongue portion, said second piston defining with said second cylinder a second fluid chamber, said second fluid chamber connected for fluid communication with said first fluid chamber, a connecting bar, one end of said connecting bar being connected to said first fluid device and the other end of said connecting bar extending slidably through a bushing in the outer end of said tongue portion, said bushing fitting loosely around said bar to prevent excessive transverse movement of said bar within said tongue portion, a sleeve of selected length connected to said one end of said connecting bar and having a flange thereon, said sleeve abutting said bushing when said connecting bar translates forward a predetermined amount relative to said tongue portion, a spring connected to said flange and to said tongue portion, said spring transferring a portion of said drawing force to said tongue portion and also urging said first fluid device toward a selected position, and, a valve system for the selected fluid connection of said first and second fluid chambers with a fluid reservoir, said valve system comprising a manual valve for selecting the volume of said first and second chambers, a one way check valve allowing flow only from said reservoir to said chambers, and a pressure relief valve allowing flow from said chambers to said reservoir only when the fluid pressure in said chambers exceeds a selected value.

3. In an earth moving apparatus having a tongue connected to a cutting element engageable with the ground adapted to be drawn by a tractor, the improvement comprising a first relatively reciprocal piston and cylinder unit housed within said tongue, a drawbar connected to one element of said unit reciprocally mounted coaxially of said tongue and said other element being secured within said tongue to permit relative axial movement of said piston and cylinder elements upon application of drawing force to said drawbar, a supporting axle for said apparatus extending transversely to said tongue and carrying ground engaging wheels at each end thereof, means fixedly connecting said axle and tongue, a post member rockably mounted centrally of said axle and extending upwardly therefrom, means on said post member pivotally supporting said apparatus, a second relatively reciprocal piston and cylinder unit, one element of said second unit being connected to said tongue and the other being connected to said rockable post member adjacent its upper end, hydraulic fluid conduit means connecting the first and second piston and cylinder units wherein the second is in slave relationship to the first such that the application of a drawing force tends to cause a proportionate extension of the drawbar and first unit producing a corresponding extension of the second unit thereby tending to rotate said post member and tongue oppositely about said axle.

4. The improvement according to claim 3 wherein said means connecting the axle and tongue comprises a yoke secured to the tongue having laterally spaced arms secured to the axle on opposite sides of the centerline of the apparatus and said post member being rockably mounted intermediate said arms.

* * * * *